(12) United States Patent
Ohkubo et al.

(10) Patent No.: US 7,184,381 B2
(45) Date of Patent: Feb. 27, 2007

(54) OPTICAL DISK, OPTICAL DISK RECORDING/REPRODUCTION APPARATUS, AND OPTICAL DISK SIGNAL QUALITY EVALUATION METHOD

(75) Inventors: Shuichi Ohkubo, Tokyo (JP); Hiromi Honma, Tokyo (JP); Masatsugu Ogawa, Tokyo (JP); Masaki Nakano, Tokyo (JP); Toshiaki Iwanaga, Tokyo (JP); Yutaka Kashihara, Yokohama (JP); Yuuji Nagai, Yokohama (JP)

(73) Assignees: NEC Corporation, Tokyo (JP); Kabushiki Kaisha Toshiba, Tokyo (JP)

( * ) Notice: Subject to any disclaimer, the term of this patent is extended or adjusted under 35 U.S.C. 154(b) by 607 days.

(21) Appl. No.: 10/736,572

(22) Filed: Dec. 17, 2003

(65) Prior Publication Data

US 2004/0208101 A1 Oct. 21, 2004

(30) Foreign Application Priority Data

Dec. 17, 2002 (JP) ............................. 2002/365772
Nov. 17, 2003 (JP) ............................. 2003/386726

(51) Int. Cl.
*G11B 5/09* (2006.01)
(52) U.S. Cl. .................. 369/59.22; 369/59.19; 369/53.1; 369/124.01
(58) Field of Classification Search ................. None
See application file for complete search history.

(56) References Cited

U.S. PATENT DOCUMENTS 5,764,608 A * 6/1998 Satomura .................. 369/59.21
2005/0190630 A1 * 9/2005 Fujimoto et al. ......... 365/230.05

* cited by examiner

*Primary Examiner*—Muhammad Edun
(74) *Attorney, Agent, or Firm*—Sughrue Mion, PLLC

(57) ABSTRACT

In order to evaluate the quality of a signal recorded on an optical recording medium, a target signal is obtained based on a predetermined data string and a predetermined partial response characteristic, and for each clock cycle, an equalization error is calculated that is a difference between the target signal and a signal reproduced each clock cycle. Further, the product of the equalization errors calculated at different times is obtained, and based on the obtained product, the quality of a signal is evaluated.

27 Claims, 8 Drawing Sheets

OPTICAL DISK, OPTICAL DISK RECORDING/REPRODUCTION APPARATUS, AND OPTICAL DISK SIGNAL QUALITY EVALUATION METHOD

BACKGROUND OF THE INVENTION

1. Field of the Invention

The present invention relates to an optical disk, an optical disk recording/reproduction apparatus, and a method for evaluating optical data of the optical disk.

2. Related Background Art

Optical disks are classified into two types: read-only optical disks on which data are recorded in advance and optical disks on which data can be recorded. To record data on the read-only optical disk, generally, an exposure process called a mastering process is performed to form embossments (physically raised and recessed conditions) on the optical disk. Then, to record data on the recordable optical disk, the optical disk is irradiated with a focused laser beam to change a specific physical characteristic of a recording film.

Conventionally, when evaluating the quality of data or signals recorded on an optical disk, a measurement is generally made of the jitter characteristic of a reproduction signal that is obtained by irradiating with a laser beam and that is reflected by the optical disk. As is shown in FIG. 1, the jitter characteristic is usually represented as the time-transient fluctuation of an edge position that is obtained by slicing a reproduction signal at a specific reference potential.

However, as is apparent from FIG. 1, when the recording density is increased, and when a mark length is small, the signal amplitude is reduced so it does not extend across the slice level used for detecting the edge position. Therefore, performing the jitter measurement is difficult. Further, as is shown in FIG. 1, when the recording density is further increased to improve the recording capacity, the effect produced by intersymbol interference is increased and causes the signal amplitude to be reduced so that the signal amplitude does not extend across the slice level used for the detection of the edge position. As a result, performing the jitter measurement is difficult.

Conventionally, to reduce the intersymbol interference, a method has been employed that uses an equalizer to filter a reproduced waveform. However, while restricting the intersymbol interference, the equalizer generally increases the noise component. Thus, when the recording density is very high, it is difficult for the original recorded data to be obtained by decoding the reproduced signal.

As a method for accurately decoding data when the recording density is very high, there is a well known signal detection method called the PRML (Partial-Response Maximum-Likelihood) method. According to this method, a reproduced waveform is equalized (PR equalized) to provide a waveform that includes intersymbol interference for suppressing the noise component, and the data are identified by employing a method called Viterbi decoding (ML). In this instance, the PR equalization is defined by the amplitude for each data cycle (clock). For example, for PR(abc), the amplitude at time 0 is a, the amplitude at time T is b, the amplitude at time 2T is c and the amplitude at all other times is 0. The total number of components having an amplitude other than 0 is called a constraint length.

According to the PRML, instead of detecting the edge position to decode data, the value obtained by sampling a reproduced waveform each clock cycle is employed to obtain data through the Viterbi decoding. Therefore, it is difficult to estimate the detection function of the PRML based only on the time-transient fluctuation data for the edge position.

SUMMARY OF THE INVENTION

It is, therefore, one object of the present invention to provide a signal quality evaluation index to be used instead of jitter when the density is too high to measure the jitter, and a reference value therefor.

According to one aspect of the present invention, provided is a quality evaluation method for a reproduced equalized signal obtained by reproducing and equalizing a signal recorded on an optical disk by using embossing, or by using an optical data recording apparatus. This method of the present invention comprises the steps of:

calculating, for each clock cycle, an equalization error between a target signal, which is obtained based on a predetermined data string and a predetermined partial response characteristic, and a signal reproduced each clock cycle; and evaluating a signal quality based on the auto-correlation of the equalization error.

Further, according to another aspect of the invention, a signal quality evaluation method comprises the steps of:

projecting an equalization error onto a noise vector that is defined by using a partial response characteristic and a difference between two sets of time series data; and evaluating a signal quality based on a ratio of the variance of the equalization errors to an Euclid distance that is defined by using the partial response characteristic and the difference between the two sets of time series data.

According to a third aspect of the present invention, a signal quality evaluation method comprises the steps of:

designating an equalization error $v_k = (y_k - \Sigma a_{k-i} h_i)$, wherein $y_k$ denotes the value of a signal reproduced and equalized for each clock cycle, $a_k$ denotes a predetermined data string and $h_k$ denotes a predetermined partial response characteristic, and designating a time delay operator D that uses a clock time as a unit;

designating as a polynomial $A(D) = \alpha_1 D_1$, which is defined by using $\alpha_1$, a coefficient of either 1, 0 or −1, and which satisfies $\alpha_j \alpha_{j+1} \neq -1$, and designating $H(D) = h_k D_k$ as a PR polynomial that defines a partial response;

based on a polynomial defined as $N(D) = A(D)H(D) = \Sigma \epsilon_i D_i$, calculating a signal quality evaluation value S that is defined by the following equation (1)

$$S = \frac{N\left(\sum_i \varepsilon_i^2\right)^2}{\sum_{k=1}^{N}\left(\sum_i \varepsilon_i v_{k+i}\right)^2}; \quad (1)$$

and evaluating the quality of a signal recorded on an optical disk.

In addition, the quality of the signal recorded on the optical disk is evaluated based on the signal quality evaluation value S obtained for at least two sets in sets of tap coefficients $\epsilon_i$, one of which is a set of tap coefficients $\epsilon$ that provide the smallest Euclid distance $d = \Sigma \epsilon_i^2$ and another one of which is a set of tap coefficients $\epsilon$ that provide the second smallest Euclid distance d.

Furthermore, $h_0=1$, $h_1=2$, $h_2=2$, $h_3=2$ and $h_4=1$ are used as the partial response characteristic, and the quality of the signal recorded on the optical disk is evaluated based on the signal quality evaluation value S that is obtained for each set of tap coefficients a that provide an Euclid distance d of 12 or 14.

Further, $h_0=1$, $h_1=2$, $h_2=2$, $h_3=2$ and $h_4=1$ are used as the partial response characteristic, and the quality of the signal recorded on the optical disk is evaluated based on the signal quality evaluation value S that is obtained for each of at least three sets of tap coefficients $\epsilon$ that are represented by the following equation (2).

$$\epsilon : \epsilon_0=1, \epsilon_1=2, \epsilon_2=2, \epsilon_3=2, \epsilon_4=1$$

$$\epsilon : \epsilon_0=1, \epsilon_1=2, \epsilon_2=1, \epsilon_3=0, \epsilon_4=-1, \epsilon_5=-2, \epsilon_6=-1$$

$$\epsilon : \epsilon_0=1, \epsilon_1=2, \epsilon_3=0, \epsilon_4=0, \epsilon_5=0, \epsilon_6=1, \epsilon_7=2, \epsilon_8=1 \qquad (2)$$

Moreover, $h_0=1$, $h_1=2$, $h_2=2$, $h_3=2$ and $h_4=1$ are used as the partial response characteristic and $R_i = \Sigma v_k v_{k+i}/N$ is determined, wherein $v_k$ denotes an equalization error and N denotes the number of samples. And the quality of the signal recorded on the optical disk is evaluated by examining a first signal quality evaluation value $S_1$, a second signal quality evaluation value $S_2$ and a third signal quality evaluation value $S_3$ that are represented by the following equations (3), (4) and (5).

$$S_1 = \frac{14}{R_0 + (12R_1 + 8R_2 + 4R_3 + R_4)/7} \qquad (3)$$

$$S_2 = \frac{12}{R_0 + (8R_1 + R_2 - 4R_3 - 6R_4 - 4R_5 - R_6)/6} \qquad (4)$$

$$S_3 = \frac{12}{R_0 + (8R_1 + 2R_2 + R_4 + 4R_5 + 6R_6 + 4R_7 + R_8)/6} \qquad (5)$$

In addition, according to the present invention, binary data obtained by a Viterbi decoder are used for a data string used to generate a target signal for calculating the equalization error. Further, the signal quality is evaluated by using $10^4$, or more, equalization errors.

Furthermore, according to the present invention, an optical disk is provided on which data are recorded under a condition wherein the signal quality evaluation value S, or the first signal quality evaluation value $S_1$, the second signal quality evaluation value $S_2$ and the third signal quality evaluation value $S_3$, are equal to or greater than 12, and preferably are equal to or greater than 15.

According to the present invention, an optical disk recording/reproduction or reproduction apparatus performs data recording or data reproduction under a condition wherein the signal quality evaluation value S, or the first signal quality evaluation value $S_1$, the second signal quality evaluation value $S_2$ and the third signal quality evaluation value $S_3$, are equal to or greater than 12, and preferably are equal to or greater than 15.

According to the present invention, an optical disk recording/reproduction or reproduction apparatus comprises:

a function for generating a target signal based on the value of a signal reproduced for each clock cycle, a predetermined data string and a predetermined partial response characteristic; and a function for calculating an equalization error that is the difference between the signal reproduced for each clock cycle and the target signal.

Furthermore, according to the present invention, an optical disk recording/reproduction or reproduction apparatus comprises:

a function for performing addition or multiplication, or a sum of product operation, for equalization errors occurring at different times. In addition, at least $10^4$ equalization errors are obtained through calculation, For the PRML, an algorithm called Viterbi decoding is employed to discriminate data. According to the Viterbi decoding, the square of a difference between the value of a reproduction signal and a predetermined level defined by a partial response is calculated, the square sum is obtained along each path, and a path providing the smallest square sum is selected to decode the data.

When the Euclid distance between the paths is small, a detection error tends to occur in the Viterbi decoding. The Euclid distance d between different paths is defined as $d^2 = 4\Sigma\epsilon_i^2$ when $B(D) = \Sigma b_k D_k$ denotes a polynomial defined based on a data string $b_k$ along one of the paths, $C(D) = \Sigma c_k D_k$ denotes a polynomial defined based on a data string $C_k$ along the other path ($b_k$ and $c_k$ are binary data of 1 or $-1$), and $N(D) = (B(D) - C(D))H(D) = 2\Sigma\epsilon_i D_i$ is established, wherein $H(D) = \Sigma h_k D_k$ is a polynomial defining a partial response. In this case, D denotes a time delay operator using a clock time as a unit, and $h_k$ denotes a predetermined partial response characteristic. The partial response characteristic is represented as $PR(h_0, h_1, h_2, h_3 \ldots)$ generally by using the element of $h_k$ that is not 0.

Assume that the partial response characteristic is defined as $h_{0=1}$, $h_1=2$ and $h_2=1$, while $h_3$ and the following=0; that the data string $b_k$ is defined as $b_0=1$, $b_1=1$ and $b_2=-1$, while $b_3$ and the following=$-1$; and that the data string $c_k$ is defined as $c_0=-1$, $c_1=1$ and $c_2=1$, while $c_3$ and the following=$-1$. In this case, since $N(D) = 2(1-D^2)(1+2D+D^2) = 2\times(1+2D-2D^3-D^4)$, the Euclid distance d between the path along the data string $b_k$ and the path along the data string $c_k$ is obtained as $d^2 = 4 \times (1 \times 1 + 2 \times 2 + 2 \times 2 + 1 \times 1)$.

To express the binary data, a combination of 1 and 0, or a combination of 1 and $-1$, is used, and in this invention, the combination of 1 and $-1$ is used. Since the amplitude of a waveform obtained when the combination of 1 and 0 is used is ½ the amplitude of a waveform when the combination of 1 and $-1$ is used, the numerators for the evaluation values $S_1$ to $S_3$ defined by equations 10 to 12 need only be set to ¼. That is, only 3.5 or 3 need be used.

When the PR polynomial is defined, the Euclid distance d between the paths can be calculated for each set of tap coefficients $\epsilon_i$. For an optical disk, generally, a record symbol d>1 is used to limit the run length, and when, for example, the recording symbol is d=1, a mark having a length equal to or greater than 2T is recorded on the disk. In order to take this limitation into account for the calculation of the Euclid distance, restriction $\epsilon_i\epsilon_{j+1} \neq -1$ need only be provided for the set of tap coefficients $\epsilon_i$. That is, (x, 1, $-1$, y), for example, can be used as the data string $b_k$ that satisfies $\epsilon_i\epsilon_{j+1}$, and (x, 01, 1, y) can be used as the data string $c_k$. However, since the pattern (1, $-1$, 1) or ($-1$, 1, $-1$) is prohibited by the limitation d=1, with x=$-1$ or y=$-1$, the data string $b_k$ becomes a pattern that does not conform to the run length limitation (a pattern that can not exist), and with x=1 or y=$-1$, the data string $c_k$ is a pattern that is not compatible with the run length limitation. Therefore, a combination of the data strings $b_k$ and $c_k$ does not exist that satisfies $\epsilon_i\epsilon_{i+1} = -1$, while the run length limitation is satisfied. Further, when the length of a mark recorded on the disk is equal to or greater than 3T, only the restriction imposed by $\epsilon_i\epsilon_{i+1} \neq -1$ and $\epsilon_i\epsilon_{i+2} \neq -1$ need be provided.

While, for example, the data string $b_k$ is used as a reference, the probability whereat a detection error will occur for the Euclid distance d between the two paths is equivalent to the probability whereat $\Sigma(y_k-\Sigma b_{k-i}h_i)^2$ will be greater than $\Sigma(y_k-\Sigma c_{k-i}h_i)^2$ due to noise. When the data string $b_k$ is used as a reference, $y_k-\Sigma b_{k-i}h_i$ is an equalization error. Further, the difference between $\Sigma(y_k-\Sigma b_{k-i}h_i)^2$ and $\Sigma(y^k-\Sigma c_{k-i}h_i)^2$ may be observed using the following method. An error vector is defined by regarding, as the elements of a vector, the coefficients of the polynomial defined by using the difference between B(D)H(D) and C(D)H(D), and the equalization error is projected onto the error vector. In this case, the probability of the occurrence of a detection error is defined as the probability whereat the magnitude of the noise (the variance of the noise) projected onto the error vector is greater than half the Euclid distance between the paths. Therefore, when the ratio of the Euclid distance between the paths to the variance of the noise projected onto the error vector need only be calculated to estimate the quality of a signal. When data are obtained in advance when the recording condition is adjusted, this data string can be used as a reference data string, and when such data have not yet been obtained, probable binary data that are obtained by a Viterbi decoder can be used.

When the data string $b_k$ is defined as $b_0=-1$ and $b_1=1$ and $b_2$ and the following=1, and when the data string $c_k$ is defined as $c_0=1$ and $c_1$ and the following=1, $\alpha_0=0$ and $\alpha_1$ and the following=0 are obtained while $A(D)=C(D)-B(D)=2\Sigma\alpha_j D_j$. When, for example, $h_0=1$, $h_1=2$, $h_2=2$ and $h_3=1$ are used as H(D) (corresponding to PR(1,2,2,1)), the coefficients $\epsilon_i$ of polynomial $N(D)=A(D)H(D)=2\Sigma\epsilon_i D_i$, which defines the error vector, are (1,2,2,1) in the order $\epsilon_0$, $\epsilon_1$, $\epsilon_2$ and $\epsilon_3$. Therefore, the probability whereat the data string $b_k$ will be erroneously regarded as the data string $c_k$ for PR(1221) equals the probability whereat the magnitude of the equalization error projected onto $2\times(1,2,2,1)$ is greater than half the Euclid distance (in this case, $2\times(1+2\times2+2\times2+1)^{1/2}$) between the two paths. Since the projection of the equalization error onto the error vector is represented by the following equation (6), $$\frac{2\sum_i \varepsilon_i v_{k+i}}{2\sqrt{\sum_i \varepsilon_i^2}} \tag{6}$$

the variance CN of the noise projected onto the error vector is represented by the following equation (7).

$$CN = \frac{\sum_{k=1}^{N}\left(\sum_i \varepsilon_i v_{k+i}\right)^2}{N\sum_i \varepsilon_i^2} \tag{7}$$

Further, since half of the Euclid distance between the two paths, which corresponds to the signal amplitude, is represented by the following equation (8), $$\sqrt{\sum_i \varepsilon_i^2} \tag{8}$$

and since the square E of the amplitude that corresponds to electric power is represented by the following equation (9), $$E = \sum_i \varepsilon_i^2 \tag{9}$$

E/CN can be obtained as an index that is correlated with the error probability.

Since coefficient 2 related to the entire A(D) and N(D) does not affect the calculation results, the same results are obtained through the calculation using $A(D)=\Sigma\alpha_j D_j$ and $N(D)=\Sigma\epsilon_i D_i$, with the coefficient 2 being omitted.

As is described above, $v_k=(y_k-\Sigma a_{k-i}h_i)$ is defined as an equalization error wherein $y_k$ denotes the value of a signal reproduced and equalized for each clock cycle, $a_k$ denotes a predetermined data string for generation of a target signal and $h_k$ denotes a predetermined partial response, while D is defined as a time delay operator using a clock time as a unit. Further, $A(D)=\Sigma\alpha_j D_j$ is a polynomial, defined by using a coefficient $\alpha_j$ having a value either of 1, 0 or −1, that satisfies $\alpha_j\alpha_{j+1}\neq -1$, and $H(D)=\Sigma h_k D_k$ is a PR polynomial that defines a partial response. Then, when the polynomial defined as $N(D)=A(D)H(D)=\Sigma_j D_j$ is employed to calculate the signal quality evaluation value defined by the following equation (10), $$S = \frac{N\left(\sum_i \varepsilon_i^2\right)^2}{\sum_{k=1}^{N}\left(\sum_i \varepsilon_i v_{k+i}\right)^2} \tag{10}$$

the probability that a detection error will occur can be obtained, i.e., the quality of a reproduced signal can be evaluated.

In the above explanation, the data strings $b_k$ and $c_k$ have been used as an example combination of data strings that tend to be erroneously regarded. However, when the variance of the noise projected onto the error vector is to be calculated, specific data strings need not always be selected to obtain an equalization error. That is, for the calculation of the equalization error variance, a time corresponding to the data string $b_k$ need not be extracted from the data string $a_k$ used for the generation of a target signal. Instead, the equalization error obtained for each clock time can be used to calculate the variance. This is because, so long as the equalization errors are stochastically distributed in accordance with the Gaussian distribution, the same results are obtained either by extracting a specific portion and calculating the variance, or by using the entire portion and calculating the variance. The variance of the noise may be calculated by using only a specific data string $b_k$; however, when the variance of the equalization errors is calculated without selecting a pattern, the configuration of the circuit is simplified.

DESCRIPTION OF THE PREFERRED EMBODIMENTS

Figure 2:
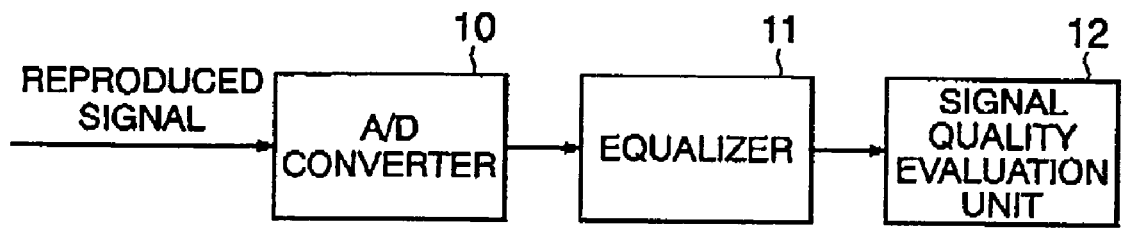
FIG. 2 is a diagram showing a configuration example for a functional block used to measure signal quality.

FIG. 2 is a diagram showing an example of functional block for calculating a signal quality evaluation value S. An A/D converter 10 performs sampling for a reproduced signal having a constant frequency, and an equalizer 11 that includes a PLL (phase lock loop) circuit obtains equalized reproduced waveform data each clock cycle. In the equalization process, while the noise component is suppressed to the extent possible, the reproduced waveform is equalized so that it is as similar as possible to a target waveform based on a PR waveform. A signal quality evaluation unit 12 calculates the signal quality evaluation value S by using the received, equalized reproduced waveform, and evaluates the quality of the reproduced waveform. When a read-only optical disk or a recordable optical disk on which data are recorded by another recording apparatus is employed, original data $a_k$ recorded on the disk are not always known in advance. In this case, binary data obtained by a discriminator (typically, a Viterbi decoder) included in the signal quality evaluation unit 12 may be employed as the data $a_k$.

Figure 3:
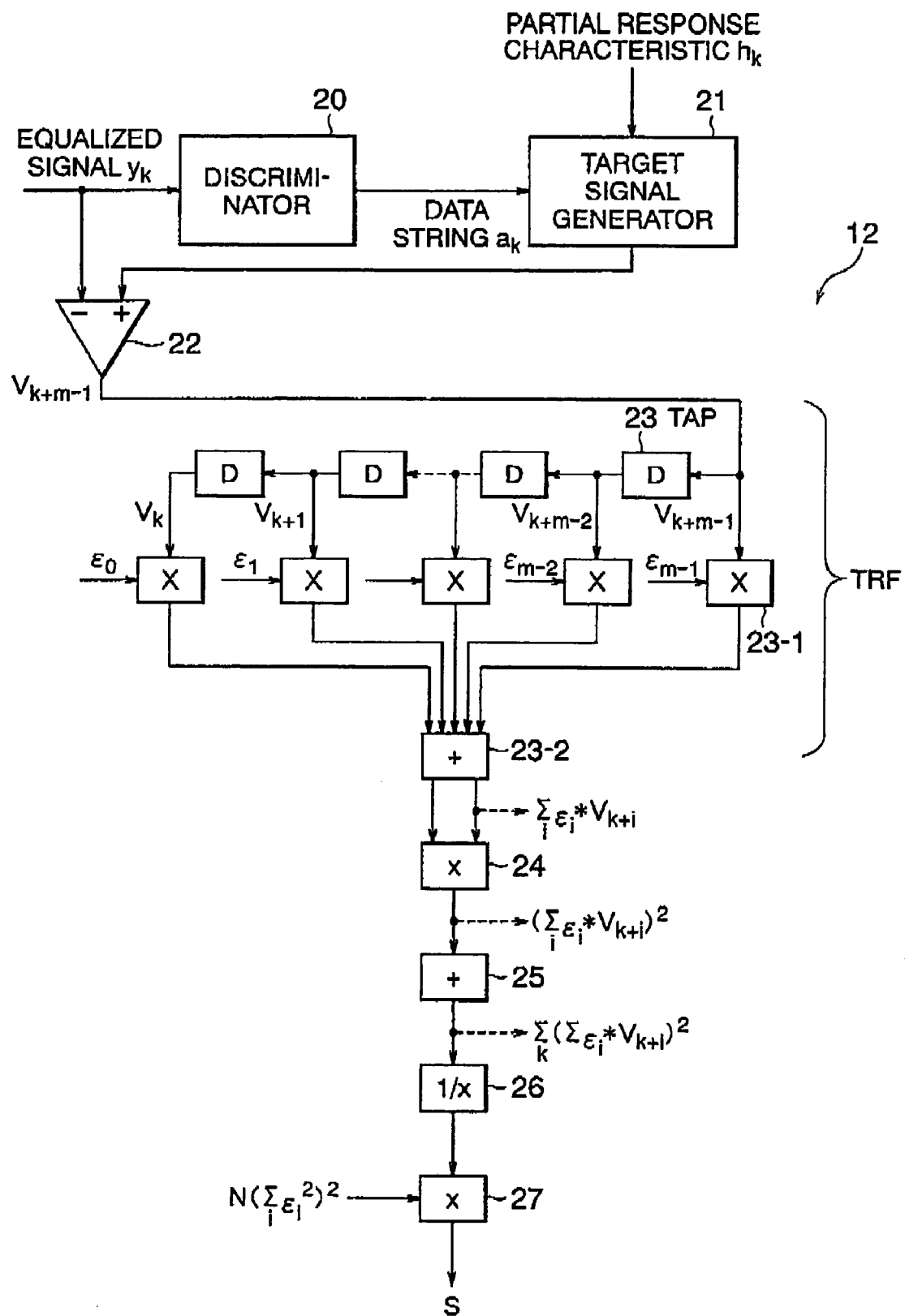
FIG. 3 is a diagram showing a configuration example for a signal quality evaluation unit for calculating the variance of equalization errors projected onto an error vector.

FIG. 3 is a detailed diagram showing the signal quality evaluation unit 12 in FIG. 2. When a reference PR waveform is denoted by $h_1$, and binary data obtained by a discriminator 20 (typically, a Viterbi decoder) is denoted by $a_k$, a target signal generator 21 generates a target signal $R_k$ based on the following equation (11).

$$R_k = \sum_i a_{k-i} \times h_i \quad (11)$$

Then, a comparator 22 calculates an equalization error $v_k$ that is the difference between a signal $y_k$, reproduced (equalized) for each clock cycle, and the target signal $R_k$. According to this configuration, in order to project the equalization error $v_k$ onto an error vector, the equalization error $v_k$ is delayed for each clock cycle by a plurality of taps 23, and the results are added by an adder 23-2 through a plurality of coefficient multipliers 23-1 each of which is for multiplying by tap coefficient $\epsilon_i$. In this configuration, the plurality of taps, namely, unit delay elements 23, the plurality of coefficient multipliers 23-1 and one adder 23-2 constitute a transversal filter TRF.

The tap coefficient $\epsilon_i$ is a coefficient of the N(D) described above. When each set of tap coefficients $\epsilon_i$ is identified by using "j", and a corresponding signal quality evaluation value S is defined as a j-th signal quality evaluation value $S_j$, a total number m of the taps 23(D) in FIG. 3 is changed, depending on j. Assume that a set of tap coefficients $\epsilon_j$ relative to j=1 is $\epsilon_0=1$, $\epsilon_1=1$, $\epsilon_2=0$, $\epsilon_3=0$, $\epsilon_4=1$ and $\epsilon_5$ and the following =0, and that a set of tap coefficients $\epsilon_j$ relative to j=2 is $\epsilon_0=1$, $\epsilon_1=2$, $\epsilon_2=1$ and $\epsilon_3$ and the following=0. In this case, m=4 is obtained to calculate the first signal quality evaluation value $S_1$, and m=2 is obtained to calculate the second signal quality evaluation value $S_2$. When changing of the number of taps in accordance with the combination j is complex, only a satisfactorily large number of taps (e.g., 15 to 20) need be prepared, and only the tap coefficients that are not required for the calculation need be set to 0.

Following this, a multiplier 24 calculates the square of equalization error $\Sigma\epsilon_i \times v_{k+1}$, which is obtained through the plurality of tap coefficient multipliers 23-1 and the adder 23-2, and an adder 25 multiplies the resultant square by the total number N of equalization error samples. As a result, a value is obtained that is proportional to the variation of the noise projected onto the error vector. When this value is divided by N and $\Sigma\epsilon_i^2$, a variation value is obtained, and since N and $\Sigma\epsilon_i^2$ are constants, these are employed as the coefficients by a multiplier 27. A divider 26 calculates the reciprocal of the obtained value, namely, the output of the adder 25, and the multiplier 27 calculates a product $(N\Sigma\epsilon_i^2) \times \Sigma\epsilon_i^2$. As a result, the signal quality evaluation value S is obtained. Actually, (N+m) reproduced waveform samples are required; however, since m is at most 20 while N is equal to or greater than $10^4$, in this invention, N is consistently employed as the number of samples. The required total number of samples will be explained later.

[First Embodiment]

The relationship between a bit error rate (bER) and the signal quality evaluation value S is examined by a read-only optical disk (ROM disk), provided in advance by using embossing to record a pit data string on a polycarbonate substrate that is 0.6 mm thick.

In this embodiment, the pit string was formed on the substrate as random data that was modulated based on the (1-7) modulation method, and the length of a 2T pit, which is the shortest, was 0.2 μm, while in the radial direction, the interval for the pits was 0.4 μm. An optical head having a wavelength of 405 nm and a numerical aperture (NA) of 0.65 for an object lens was employed to reproduce data recorded on the ROM disk at a linear speed of 6.6 m/s and at a reproduction power of 0.5 mW (in this case, a clock cycle T is 15.15 ns). Then, the reproduced waveform was equalized to PR(12221) to measure the bit error rate bER and the signal quality evaluation value S. To measure the bit error rate bER, the original data recorded on the optical disk were compared with the binary data obtained through Viterbi decoding; and to measure the signal equality evaluation value S, $10^5$ values of reproduced waveform obtained for each T after PR equalization and the binary data obtained by Viterbi decoding were employed.

The (1-7) modulated codes are codes having a limitation d>1, and relative to PR(12221), the Euclid distance is reduced in accordance with the tap coefficients $\epsilon_j$ shown in Table 1. A set of tap coefficients $\epsilon_j$ discriminated by pattern 1 in Table 1, i.e., (1 2 2 2 1), is an error vector that is determined by two data strings that tend to be erroneously discriminated in Viterbi detection, e.g., $b_k$: (1 1 1 1 −1 −1 . . . ) and $c_k$: (−1 1 1 1 −1 −1 . . . ), and partial response characteristic (1 2 2 2 1). As for the sets of tap coefficients $\epsilon_i$ for pattern 2 and the following patterns in Table 1, the number of 0s inserted between (1, 2, 1) and (−1, −2, −1) and the upper limit number of 0s inserted between (1, 2, 1) and (1, 2, 1) are determined by the upper limit repetitions of the mark/space for 2T (the upper limit repetitions of a data string of +1 +1 −1 −1, e.g., −1 −1 −1 +1 +1 −1 −1 −1 is counted as one repetition and −1 −1 −1 +1 +1 −1 −1+1+1+1 is counted as two repetitions). That is, when the upper limit repetitions of the mark/space for 2T is (2n+1), the maximum number (4n+1) of 0s are inserted between (1, 2, 1) and (−1, −2, −1). When the upper limit repetitions for the mark/space for 2T is (2n+2), the maximum number (4n+3) of 0s are inserted between (1, 2, 1) and (1, 2, 1). Therefore, the signal quality evaluation value S need only be calculated while taking into account the pattern up to the upper limit. In Table 1, the tap coefficients $\epsilon_i$, up to a maximum of five repetitions for 2T, are shown, and in this embodiment, 2T was also repeated five times at the maximum for the pattern that was recorded, using embossing, on the optical data recording medium.

A pattern having a polarity opposite to that of the pattern shown in Table 1 (for example, (−1 −2 −2 −2 −1) relative to pattern 1) may be employed; however, since the obtained signal quality evaluation value $ is the same, only a pattern having a predetermined polarity must be taken into account (either polarity can be determined, but there is no need to evaluate both). In this embodiment, fourteen taps were fixed, which corresponds to the number of taps required for the calculation of a sixth signal quality evaluation value $S_6$; and to calculate, for example, the first signal quality evaluation value $S_1$ for pattern 1, the fifth and following tap coefficients were regarded as being 0.

TABLE 1

Example sets of $\epsilon_i$

| PATTERNj | $\epsilon^i$ | $\Sigma e_i^2$ |
|---|---|---|
| 1 | 12221 | 14 |
| 2 | 1210-1-2-1 | 12 |
| 3 | 121000121 | 12 |
| 4 | 12100000-1-2-1 | 12 |
| 5 | 1210000000121 | 12 |
| 6 | 121000000000-1-2-1 | 12 |

Table 2 shows the signal equality evaluation values S measured while changing a tilt. The j-th signal quality evaluation value $S_1$ represents the one obtained for pattern j in Table 1.

TABLE 2

Relationship between a tilt and S

| TILT (DEGREES) | S1 | S2 | S3 | S4 | S5 | S6 |
|---|---|---|---|---|---|---|
| −0.3 | 14 | 14.5 | 14.4 | 14.7 | 14.7 | 15 |
| −0.2 | 15 | 15.4 | 15.4 | 15.9 | 15.9 | 16.2 |

TABLE 2-continued

Relationship between a tilt and S

| TILT (DEGREES) | S1 | S2 | S3 | S4 | S5 | S6 |
|---|---|---|---|---|---|---|
| −0.1 | 16.5 | 17.5 | 17.6 | 18 | 17.9 | 18.3 |
| 0 | 17 | 18 | 18.1 | 18.5 | 18.5 | 18.8 |
| 0.1 | 16.7 | 17.1 | 17.1 | 17.5 | 17.6 | 17.8 |
| 0.2 | 14.8 | 15.3 | 15.3 | 15.8 | 15.7 | 16 |
| 0.3 | 13.8 | 14.2 | 14.1 | 14.6 | 14.6 | 14.9 |

Figure 4:
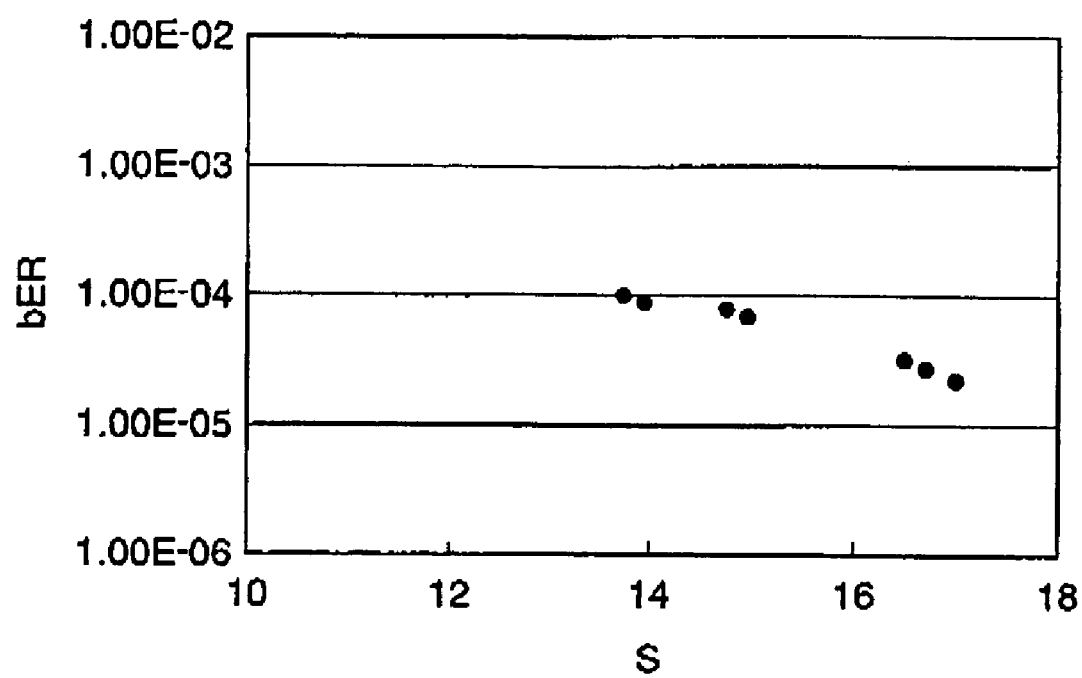
FIG. 4 is a graph showing the relationship between a signal quality evaluation value S and a bit error rate bER.

As is shown in Table 2, the signal quality evaluation value (first signal quality evaluation value) $S_1$ for pattern 1 was the smallest under all the tilt conditions in the embodiment. FIG. 4 is a graph showing the relationship between the smallest signal quality evaluation value S under each tilt condition and the bit error rate bER. As is apparent from FIG. 4, an obvious correlation is established between the signal quality evaluation value S and the bit error rate bER.

In this embodiment, the original data recorded in advance on the optical disk have been employed to measure the bit rate error bER. Since it is usually difficult for the original data recorded on a read-only disk to be accurately known, the measurement of the bit error rate bER is almost disabled, and it is, therefore, very difficult for the conduct of the reproduction to be adjusted by using the bit error rate bER as an index. However, even in such a case, as is explained in this embodiment, when the reproduction condition is adjusted by using the signal quality evaluation value S as an index, data recorded on the optical disk can be stably reproduced.

As is apparent from Table 2, under each tilt condition the fourth signal quality evaluation value $S_4$ or the sixth signal quality evaluation value $S_6$ is greater than the second signal quality evaluation value $S_2$, and the fifth signal quality evaluation value $S_5$ is greater than the third signal quality evaluation value $S_3$. Thus, only patterns 2 and 3 in Table 1 may be employed, as patterns that provide $\Sigma\epsilon_i^2=12$, to simplify the evaluation of the signal quality evaluation value S.

It should be noted that there are patterns (1 2 1 0 −1 −1 1 1 0 −1 −2 −1) and (1 2 1 0 0 0 1 1 −1 −1 0 1 2 1) as example patterns for tap coefficients $\epsilon_i$ that provide the third smallest $\Sigma\epsilon_i^2$, i.e., $\Sigma\epsilon_i 2=16$. Although not shown in Table 2, the signal quality evaluation values S obtained for these patterns are not smaller than the signal evaluation value S obtained for a pattern that provides $\Sigma\epsilon_i^2=12$ or 14. Therefore, the evaluation of the signal quality evaluation value S is not always necessary for the pattern that provides $\Sigma\epsilon_i^2=16$.

[Second Embodiment]

The relationship between the bit error rate bER and the signal quality evaluation value S was examined by using a phase change optical disk formed on a 0.6 mm thick polycarbonate substrate, wherein the pitches of guide grooves were 0.68 µm. For the evaluation, while the phase change optical disk was rotated at a linear speed of 5.6 m/s, an optical head having a wavelength of 405 nm and NA=0.65 was employed to record and reproduce random data that were obtained through (1-7) modulation at a clock frequency of 64.6 MHz (clock cycle of 15.48 ns). As well as in the first embodiment, the PR equalization was PR(12221). The random data were overwritten twenty times, using a recording power of 6 mW and an erasing power of 2.5 mW, and then, the signal quality evaluation value S and the bit error rate bER were measured while the focus offset value was changed. As well as in the first embodiment, the recording was performed for up to a maximum five repetitions of 2T, and the first to sixth signal quality evaluation values $S_1$ to $S_6$ were calculated by employing $10^5$ values of reproduced waveforms obtained for each clock after the PR equalization and the binary data obtained by Viterbi decoding.

TABLE 3

Relationship between defocusing and S

| DEFOCUSING (μm) | S1 | S2 | S3 | S4 | S5 | S6 |
|---|---|---|---|---|---|---|
| −0.3 | 12 | 11.5 | 11.8 | 11.8 | 12 | 12 |
| −0.2 | 15 | 14.4 | 14 | 14.7 | 14.3 | 15.1 |
| −0.1 | 17 | 16.4 | 16.1 | 16.8 | 16.5 | 17 |
| 0 | 18 | 17.5 | 17 | 18 | 17.4 | 18.3 |
| 0.1 | 16.9 | 16.3 | 16 | 16.9 | 16.3 | 17.2 |
| 0.2 | 14.8 | 14.5 | 13.8 | 15 | 15 | 15.4 |
| 0.3 | 11.8 | 11.5 | 12 | 11.9 | 11.9 | 12.2 |

Figure 1:
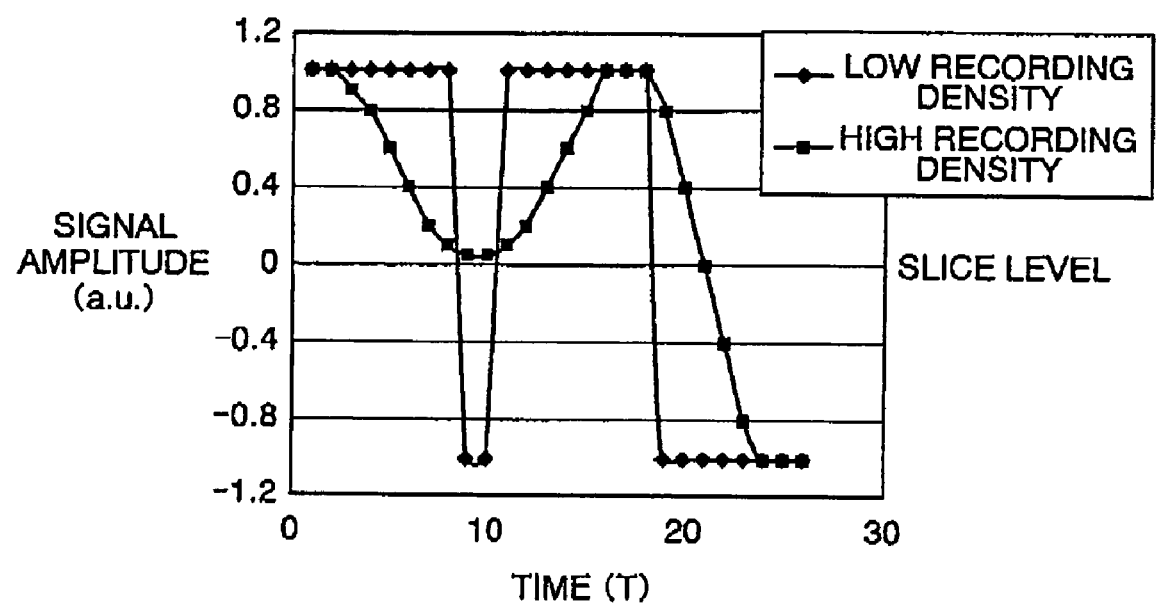
FIG. 1 is a schematic graph for explaining change of a reproduced waveform when a recording density is changed.
Figure 5:
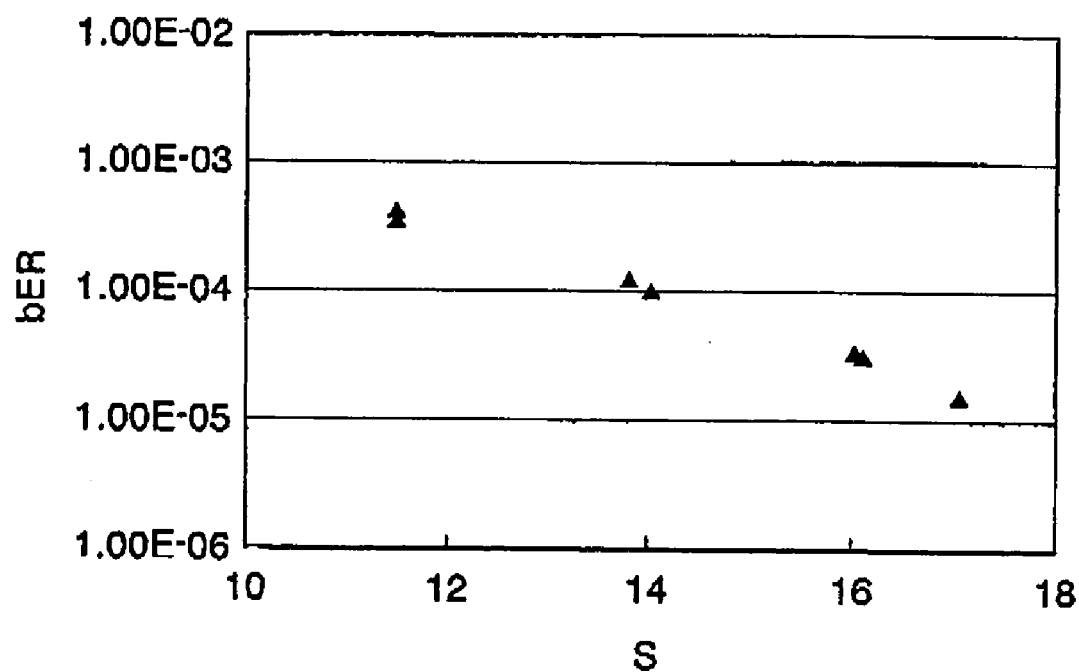
FIG. 5 is a graph showing the relationship between the signal quality evaluation value S and the bit error rate bER.

As is shown in FIG. 3, under each condition in this embodiment the signal quality evaluation value S for pattern 2 or 3 was the smallest. FIG. 5 is a graph showing the relationship between the smallest signal quality evaluation value S and the bit error rate bER under each defocusing condition. As is apparent from FIG. 5 as well as from FIG. 4, there is an obvious correlation between the signal quality evaluation value S and the bit error rate bER, and this correlation is the same as that in FIG. 1. It was also confirmed that, when the smallest signal quality evaluation value S was equal to or greater than 12, the bit error rate bER was equal to or greater than $3\times10^{-4}$. The bit error rate bER $3\times10^{-4}$ is an index value with which error correction is enabled by using an ECC (error correcting code), such as Reed-Solomon code, to obtain a signal at a level that presents no problem when put to practical use. Therefore, when the reproduction condition (a tilt or defocusing) is adjusted to obtain the smallest signal quality evaluation value of 12 or greater, the optical disk reproduction apparatus can be stably operated.

Since the quality of the reproduced signal may be deteriorated due to a disturbance, it is preferable that, when the reproduction condition is adjusted, the bit error rate bER be set lower, by about one digit, than the threshold value for the stable operation of the apparatus. To obtain this bit error rate bER, as is apparent from FIG. 5, the signal quality evaluation value S need only be equal to or greater than 15, Therefore, it is preferable that the reproduction condition be adjusted to satisfy a condition wherein the smallest signal quality evaluation value S is equal to or greater than 12, and more preferably, is equal to or greater than 15.

As is apparent from Table 3, under each defocusing condition the fourth signal quality evaluation value $S_4$ or the sixth signal quality evaluation value $S_6$ is greater than the second signal quality evaluation value $S_2$, and the fifth signal quality evaluation value $S_5$ is greater than the third signal quality evaluation value $S_3$. Therefore, only patterns 2 and 3 in Table 1 may be employed, as patterns that provide $\Sigma\epsilon_i^2=12$, to simplify the evaluation of the signal quality evaluation value S.

As is described above, the recording/reproduction condition can be adjusted based on the signal quality evaluation value S. However, as is shown in the first and the second embodiments, since the smallest signal quality evaluation value S is either the first signal quality evaluation value $S_1$, the second signal quality evaluation value $S_2$ or the third signal quality evaluation value $S_3$, the adjustment of the recording/reproduction condition can be simplified by examining these three signal quality evaluation values S.

Figure 9:
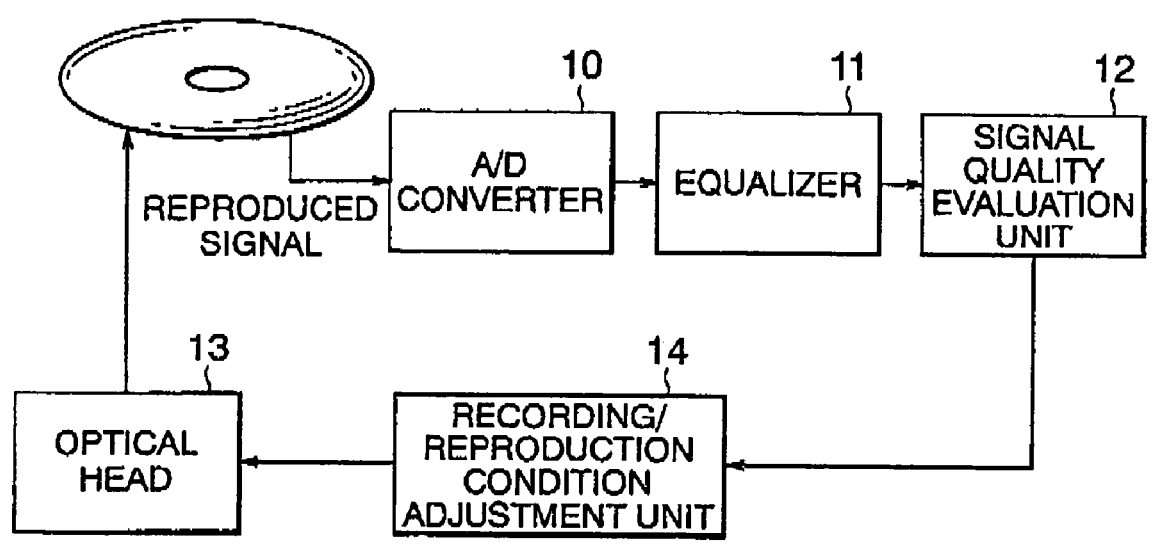
FIG. 9 is a diagram showing an optical data recording/reproduction apparatus according to the present invention that has a function for adjusting a recording condition or a reproduction condition.

FIG. 9 is a diagram showing an example of an optical data recording/reproduction apparatus that includes a function for adjusting a recording condition or a reproduction condition based on the signal quality evaluation value S. The quality of a reproduced signal that is read by an optical head 13 is determined based on the signal quality evaluation value S obtained by a signal quality evaluation unit 12. While the recording/reproduction condition, e.g., a tilt or defocusing or recording power, is changed by a recording/reproduction condition adjustment unit 14, the signal quality evaluation value S is calculated for each condition, and the condition whereunder the signal quality evaluation value S reaches the maximum, or the recording/reproduction condition whereunder the signal quality evaluation value S reaches a constant value (e.g., is equal to or greater than the 12 described above), is found. As a result, the data recording/reproduction operation can be performed under a stabilized condition.

[Third Embodiment]

A third embodiment for calculating the signal quality evaluation value S will now be described.

By employing $\Sigma(v_k+2v_{k+1}+2v_{k+2}+2v_{k+3}+v_{k+4})^2=N\times(14R_0+24R_1+16R_2+8R_3+2R_4)$, wherein $R_i=\Sigma v_k v_{k+i}/N$ is defined, the first signal quality evaluation value $S_1$ for the first or the second embodiment can also be represented by the following equation (12):

$$S_1 = \frac{14\times14}{14R_0+24R_1+16R_2+8R_3+2R_4} \quad (12)$$
$$= \frac{14}{R_0+(12R_1+8R_2+4R_3+R_4)/7}$$

Similarly, the second signal quality evaluation value $S_2$ and the third signal quality evaluation value $S_3$ can also be represented by the following equations (13) and (14):

$$S_2 = \frac{12\times12}{12R_0+16R_1+2R_2-8R_3-12R_4-8R_5-2R_6} \quad (13)$$
$$= \frac{12}{R_0+(8R_1+R_2-4R_3-6R_4-4R_5-R_6)/6}$$

$$S_3 = \frac{12\times12}{12R_0+16R_1+4R_2+2R_4+8R_5+12R_6+8R_7+2R_8} \quad (14)$$
$$= \frac{12}{R_0+(8R_1+2R_2+R_4+4R_5+6R_6+4R_7+R_8)/6}$$

$R_i$ corresponds to the autocorrelation of an qualization error, and it is understood that when the values other than $R_0$ are 0, the characteristic of the equalization error is white, The same calculation can be performed for the signal quality evaluation values S other than the first, the second and the third signal quality evaluation values $S_1$, $S_2$ and $S_3$ in Table 1, or for a set of arbitrary tap coefficients $\epsilon_i$, so that the signal quality evaluation value S can be represented as the auto-correlation function.

Figure 6:
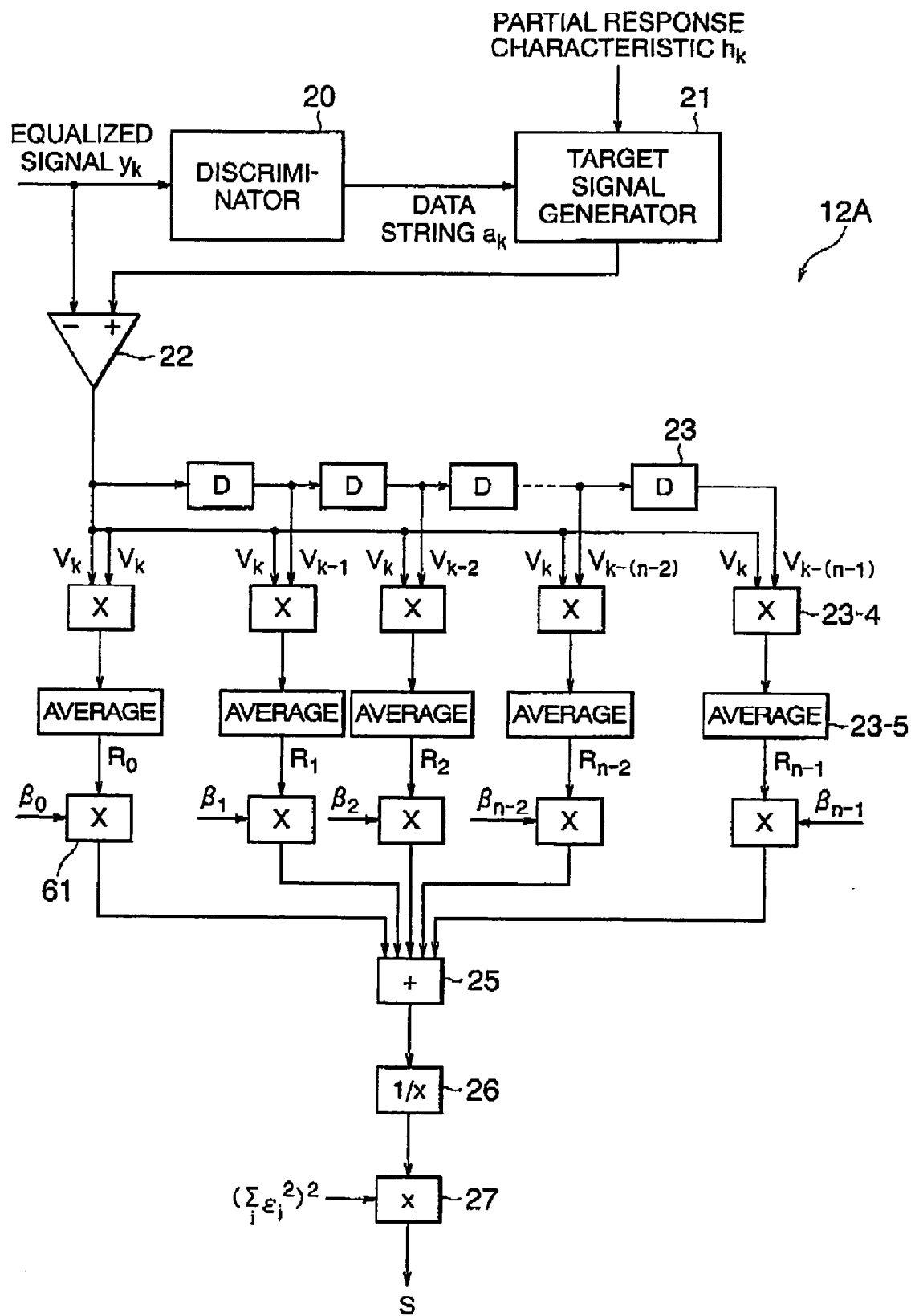
FIG. 6 is a diagram showing another configuration example for the signal quality evaluation unit for calculating the signal quality evaluation value S.

FIG. 6 is a diagram showing a configuration example for the functional block of a signal quality evaluation unit 12A for calculating the signal quality evaluation value S expressed as the auto-correlation function. Unlike in FIG. 3, the auto-correlations for equalization errors are calculated and predetermined weighting (multiplication of coefficient $\beta_i$ by multipliers 61) is performed for these results, and the resultant values are added by an adder 25. To calculate the first signal quality evaluation value $S_1$, for example, the coefficients $\beta_i$ used by the multiplier 61 need only be set as $\beta_0=14$, $\beta_1=24$, $\beta_2=16$, $\beta_3=8$ and $\beta_4=2$ when the numerator for the signal quality evaluation value $S_1$ is 14×14. When the numerator for the signal quality evaluation value $S_1$ is 14, the coefficients $\beta_i$ need only be set as $\beta_0=14/14$, $\beta_1=24/14$, $\beta_2=16/14$, $\beta_3=8/14$ and $\beta_4=2/14$. The number of the multipliers 61 in FIG. 6 is varied, depending on the j-th signal quality evaluation value $S_j$ to be calculated, and nine multipliers are required to obtain the third signal quality evaluation value $S_3$. In this case also, when depending on the pattern changing the number of multipliers is complex, only a satisfactorily large number (15 to 20) of multipliers need be prepared, and only the coefficients of the multipliers that are not used for calculation need be set to 0. In FIG. 6, 23-4 is a multiplier and 23-5 is a mean average calculation unit. The mean average calculation units 23-5 may be implemented by, for example, low-pass filters or digital operation units.

Further, in FIG. 6, the acquisition of the mean average may not be performed (no division is performed using the total number N of samples). In this case, simply, only the sum described above must be obtained, and only the numerator of the signal quality evaluation value S (12 or 14 in this embodiment) must be multiplied by N.

The measurement process as performed for the first and the second embodiment was conducted with the configuration in FIG. 6, and it was confirmed that the same signal quality evaluation value S was acquired as was obtained in the first and the second embodiments.

When it is known in advance that the characteristic of the equalization error is absolutely white, or nearly white, only $R_0$ may be calculated.

As is described above, according to the reproduction method using PR(12221) equalization, predetermined addition and multiplication are preformed for the auto-correlation of an equalization error $v_m$ for each clock time, and the first, second and third signal quality evaluation values $S_1$, $S_2$ and $S_3$ are obtained using the following equations (15) to (17). Then, the smallest value is examined to evaluate the quality of the reproduced, equalized signal.

$$S_1 = 14/\sigma_1^2, \quad (15)$$
$$\sigma_1^2 = R_0 + (12R_1 + 8R_2 + 4R_3 + R_4)/7,$$
$$R_i = \left(\sum_{m=1}^{m=N} v_m v_{m+i}\right) / N$$

$$S_2 = 12/\sigma_2^2, \quad (16)$$
$$\sigma_2^2 = R_0 + (8R_1 + R_2 - 4R_3 - 6R_4 - 4R_5 - R_6)/6,$$
$$R_i = \left(\sum_{m=1}^{m=N} v_m v_{m+i}\right) / N$$

$$S_3 = 12/\sigma_3^2, \quad (17)$$
$$\sigma_3^2 = R_0 + (8R_1 + 2R_2 + R_4 + 4R_5 + 6R_6 + 4R_7 + R_8)/6,$$
$$R_i = \left(\sum_{m=1}^{m=N} v_m v_{m+i}\right) / N$$

[Fourth Embodiment]

Figure 7:
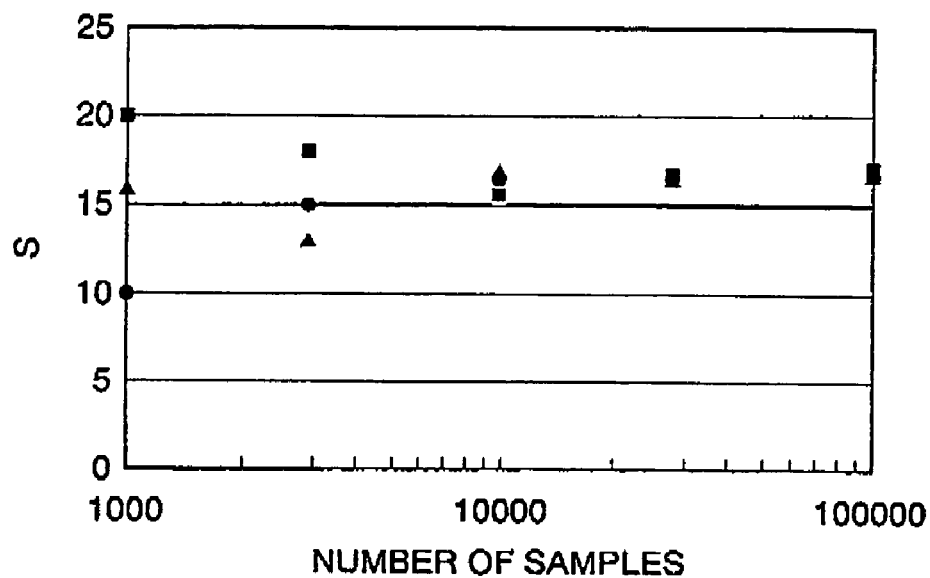
FIG. 7 is a graph showing the relationship between the number of samples and the signal quality evaluation value S.

The relationship between the total number of sampling values for reproduced waveforms and the signal quality evaluation value S was examined by using the read-only optical disk described in the first embodiment. The optical head and the measurement conditions, such as the linear speed and the PR equalization, were the same as those for the first embodiment, except for the total number of sampling values. It should be noted that in this embodiment the measurement was conducted under a condition for which the tilt degree was 0. FIG. 7 is a graph showing the smallest signal evaluation value S (the first signal quality evaluation value $S_1$ in this embodiment) that was obtained by several measurement operations performed under each condition for which the total number of samples was changed. As is shown in FIG. 7, when the number of samples is smaller than 10000, the signal quality evaluation values S are distributed across a wide range, which means that adjusting the reproduction condition is difficult. In order to adjust the reproduction condition by using the signal quality evaluation value S as an index, at least 10000 samples are required.

Further, to measure the signal quality evaluation value S in consonance with the actual disk format, it is convenient for the measurement to be conducted for each ECC block unit, at the least. For example, for 64 Kbit ECC blocks, samples for 786432 bits are employed, and this is satisfactory for the accurate measurement of the signal quality evaluation value S.

[Fifth Embodiment]

The relationship between the number of sample reproduced waveforms and the signal quality evaluation value S was examined by using the phase change optical disk described in the second embodiment. The optical head and the measurement conditions, such as the linear speed and the PR equalization, were the same as those for the second embodiment, except for the total number of samples. It should be noted that in this embodiment the measurement was performed with a focus offset of 0. While the total number of samples was changed, the signal quality evaluation value S (in this case, the third signal quality evaluation value $S_3$, which is the smallest of all) was measured by performing several measurements under each condition. As a result, as well as in the fifth embodiment, it was confirmed that the signal quality evaluation values S were distributed across a wide range when the number of samples was smaller than 10000. Therefore, to adjust the reproduction condition using the signal quality evaluation value S as an index, at least 10000 samples are required.

[Sixth Embodiment]

Figure 8:
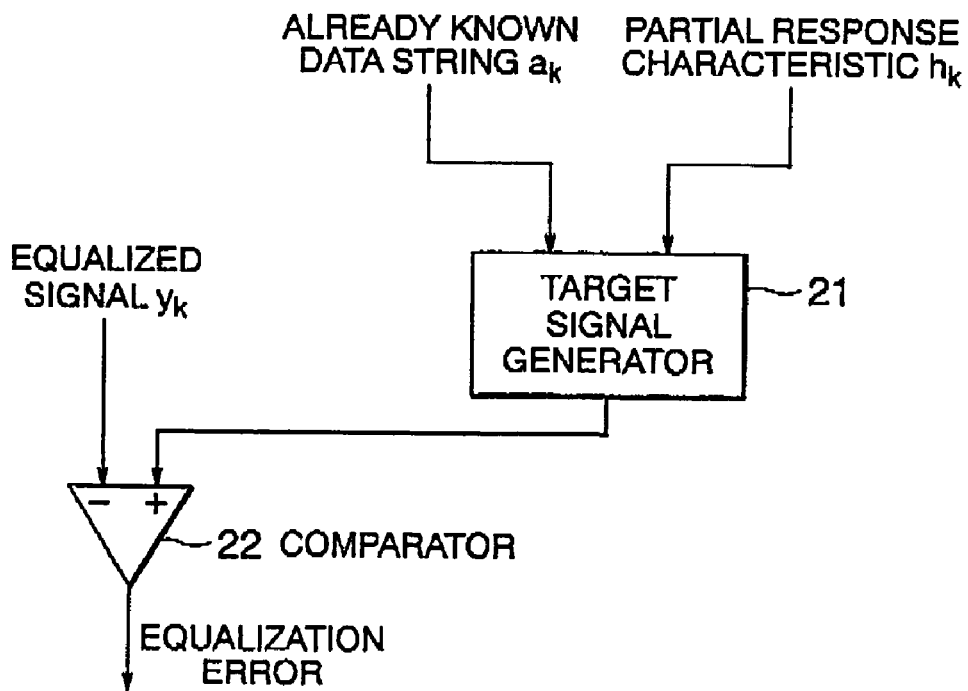
FIG. 8 is a diagram showing a configuration example for a functional block for calculating the signal quality evaluation value S when recorded data are already known.

FIG. 8 is a diagram showing an example functional block for evaluating the quality of a signal when recorded data are known. While to calculate an equalization error only the functional block is shown in FIG. 8, the configuration in FIG. 3 or 6 can be employed for the signal quality evaluation operation after the equalization error has been obtained. When the signal quality evaluation value S is to be measured for data that are recorded by a recording/reproduction apparatus, instead of employing data output by a Viterbi decoder, the recorded data that are already known can be used as reference data. Further, for a reproduction apparatus, since the same data are always recorded at a predetermined location on an optical disk, when data are already known, the data are recorded in the internal memory of the reproduction apparatus so that they can be employed as reference data for evaluating the signal quality evaluation value S.

[Seventh Embodiment]

When PR(12221) and record symbol of d>1 are employed, the signal quality evaluation value S must only be measured for patterns shown in Table 4. Further, to simplify the process, the signal quality evaluation values S may be measured only for patterns 1 and 2.

TABLE 4

| PATTERN | Example sets of $\epsilon_i$ | |
|---|---|---|
| | $\epsilon_i$ | $\Sigma e_i^2$ |
| 1 | 1221 | 10 |
| 2 | 121-1-2-1 | 12 |
| 3 | 121-1-1121 | 14 |

The combination of (1-7) modulation and PR(12221) have been mainly employed for the explanation of the embodiments. However, a combination of another PR method and another modulation symbol may be employed, and the value S provided, according to the present invention, as the established form can be calculated, so that the evaluation of the signal quality and the adjustment of the recording/reproduction condition are enabled even when the recording density is too high to measure jitter.

[First Modification]

An explanation has been given for the embodiments wherein the signal quality is evaluated based on an equalization error for each clock time, without requiring that an erroneously determined data string be determined.

However, it is also possible for a predetermined data string that has been erroneously determined to be determined, and for an equalization error for this data string to be employed for evaluating the signal quality provided by an optical disk. In this case, only a determination unit 71 in FIG. 10 need be provided for the signal quality evaluation unit in FIG. 3 or 6, and only an equalization error need be obtained for a data pattern that has been erroneously determined. The determination unit 71 in FIG. 10 has a function for outputting an equalization error to the succeeding process block (namely, mean average calculation units 23-6) only for a pattern that has been predetermined.

As is described in the first embodiment, according to the reproduction method that uses PR(12221), an erroneous detection tends to occur for a set of data strings that provides $\Sigma\epsilon_i^{2}=12$ or 14. For example, the set of data strings that provides 14 is a set of data strings that differ by only one bit, such as (x 1 1 1 −1 −1 x) and (x 1 1 −1 −1 −1 x) (x is either 1 or −1). When equation (19) is employed for the equalization error for the data string (x 1 1 1 −1 −1x) and the equalization error for the data string (x 1 1 −1 −1 −1 x), the first signal quality evaluation value $S_1$ can be obtained. It should be noted that the data strings used for calculating the first signal quality evaluation value $S_1$ are not limited to these two strings, and all other data strings that differ by only on bit can be employed.

Furthermore, a set of data strings wherein two bits located at a distance represented by the time 2T are different, such as (x x 1 1 1 −1 −1 1 x) and (x x 1 1 −1 −1 1 1 x), is an example set that provides $\Sigma\epsilon_i^2$ and that is used to calculate the second signal quality evaluation value $S_2$. As well as for the first signal quality evaluation value $S_1$, equation (20) can be employed for the equalization error for data string (x x 1 1 1 −1 −1 1 x) and the equalization error for data string (x x 1 1 −1 −1 1 1 x), so that the second signal quality evaluation value $S_2$ can be calculated. It should be noted that the data strings used for calculating the second signal quality evaluation value $S_2$ are not limited to these two, and all other data strings wherein two bits located at a distance represented by the time 2T are different can be employed.

In addition, a set of data strings wherein two bits located at a distance represented by the time 2T are continuously different, such as (x 1 1 1 −1 −1 1 1 −1 −1 1 1 x) and (x 1 1 −1 −1 1 1 1 −1 −1 1 1 1 1 x), is an example set used to calculate the third signal quality evaluation value $S_3$.

In this embodiment, the data strings used to calculate the first, the second and the third signal quality evaluation values $S_1$, $S_2$ and $S_3$ are recorded in advance on the determination unit 71, and only when these data strings have been received by the determination unit 71 is the calculation performed for the signal quality evaluation value S.

Figure 10:
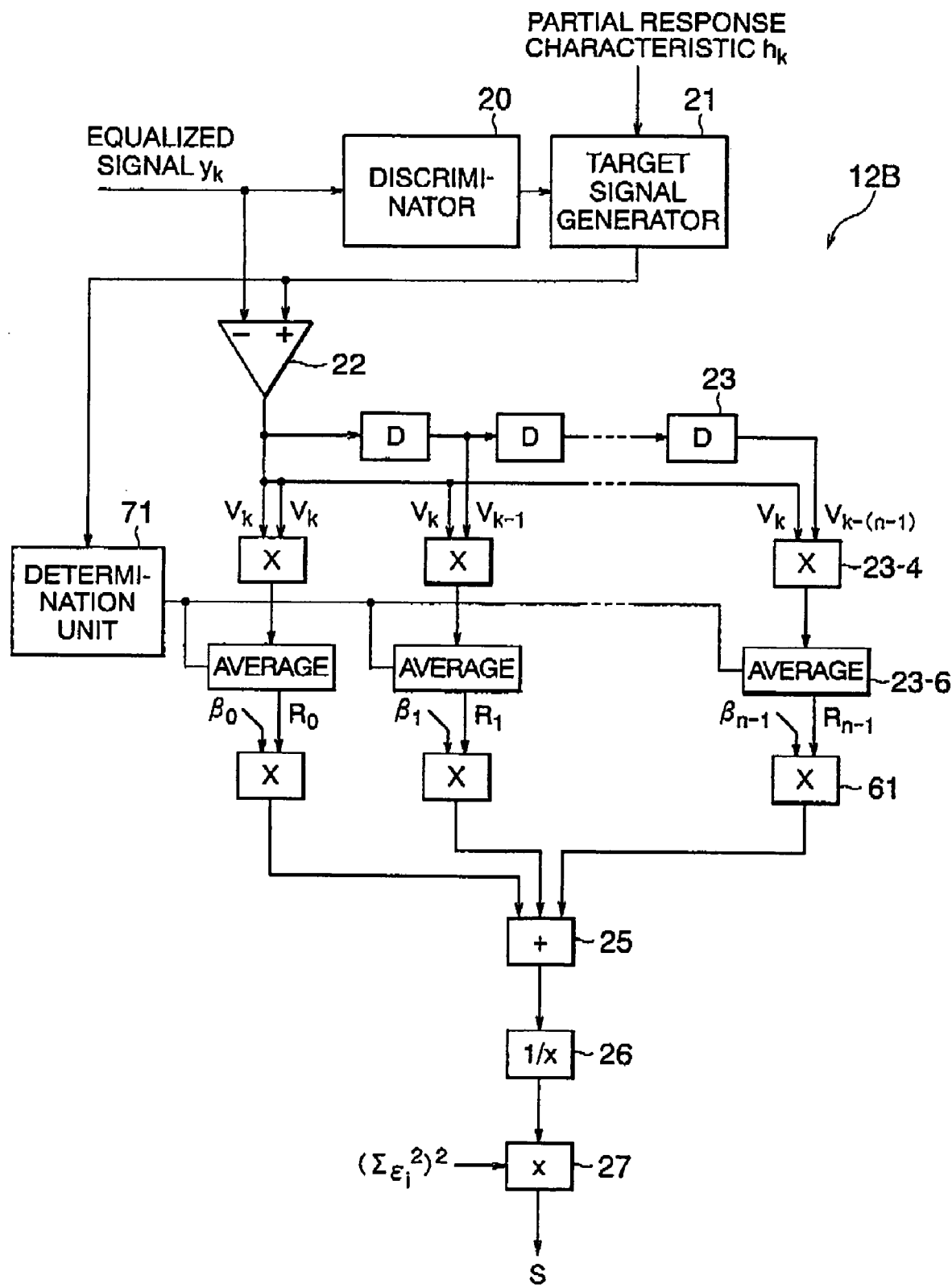
FIG. 10 is a diagram showing a signal quality evaluation unit for calculating the signal equality evaluation value S by using only a target signal that has been predetermined.

FIG. 10 is a diagram showing an example wherein a signal is transmitted by a target signal generator 21 to the determination unit 71. Instead, however, a signal output by a discriminator (a Viterbi decoder) 20 may be transmitted to the determination unit 71.

[Second Modification]

FIG. 9 is a diagram showing an example optical data recording/reproduction apparatus that comprises the recording/reproduction condition adjustment unit 14, which has a function for adjusting one or both of a recording condition and a reproduction condition based on the signal quality evaluation value S obtained by the signal quality evaluation unit 12.

When the recording/reproduction condition adjustment unit 14 adjusts a recording/reproduction condition, such as a tilt, focus or a recording power, the optical head 13 reads a signal based on the recording/reproduction condition adjusted by the recording/reproduction condition adjustment unit 14. The signal quality evaluation unit 14 then calculates the signal quality evaluation value S for the signal read by the optical head 13. Thereafter, the recording/reproduction condition adjustment unit 14 receives the obtained signal quality evaluation value S.

Next, while changing the recording/reproduction condition, the recording/reproduction condition adjustment unit 14 searches for the optimal recording/reproduction condition, or for one that, at the least, is at a specific satisfactory level, so that the signal quality evaluation value S obtained is the optimum or equals a predetermined value (e.g., is equal to or greater than the 12 described above). The optical head 13 performs data recording/reproduction for the optical disk based on the optimum or a satisfactory recording/reproduction condition that is determined by the recording/reproduction condition adjustment unit 14. Through this processing, since the recording/reproduction condition adjustment unit 14 can determine the optimum or a preferable recording condition or reproduction condition based on, as an index, the signal quality evaluation value S that is obtained by the signal quality evaluation unit 12, the condition under which data recording/reproduction is performed by the optical data recording/reproduction apparatus can be stabilized.

By using the method and apparatus of the present invention, the quality of a signal recorded on an optical data recording medium can be evaluated at a high recording density under which the evaluation of the signal quality using jitter is disabled. Further, the recording/reproduction condition can be optimized by using, as an index, the signal quality defined in the invention.

What is claimed is:

1. A signal quality evaluation method for a reproduced equalized signal obtained by reproducing and equalizing a signal recorded on an optical disk medium by using embossing, or by using an optical data recording apparatus, comprising the steps of:

calculating, for each clock cycle, an equalization error between a target signal, which is obtained based on a predetermined data string and a predetermined partial response characteristic, and a signal reproduced each clock cycle; and evaluating a signal quality based on the auto-correlation of the equalization error.

2. A signal quality evaluation method according to claim 1, wherein $h_0=1$, $h_1=2$, $h_2=2$, $h_3=2$ and $h_4=1$ are used as the partial response characteristic and $R_1=\Sigma v_k v_{k+1}/N$ is determined, wherein $v_k$ denotes an equalization error and N denotes the number of samples; and wherein the quality of the signal recorded on the optical disk is evaluated by examining a first signal quality evaluation value $S_1$, a second signal quality evaluation value $S_2$ and a third signal quality evaluation value $S_3$ that are represented by the following equations (20), (21) and (22)

$$S_1 = \frac{14}{R_0 + (12R_1 + 8R_2 + 4R_3 + R_4)/7} \quad (20)$$

$$S_2 = \frac{12}{R_0 + (8R_1 + R_2 - 4R_3 - 6R_4 - 4R_5 - R_6)/6} \quad (21)$$

$$S_3 = \frac{12}{R_0 + (8R_1 + 2R_2 + R_4 + 4R_5 + 6R_6 + 4R_7 + R_8)/6} \quad (22)$$

3. An optical disk, on which data are recorded under a condition wherein the first signal quality evaluation value $S_1$, the second signal quality evaluation value $S_2$ and the third signal quality evaluation value $S_3$ according to claim 2 are equal to or greater than 12.

4. An optical disk, on which data re recorded under a condition wherein the first signal quality evaluation value $S_1$, the second signal quality evaluation value $S_2$ and the third signal quality evaluation value $S_3$ according to claim 2 are equal to or greater than 15.

5. An optical disk recording/reproduction apparatus or reproduction apparatus for performing data recording or data reproduction under a condition wherein the first signal quality evaluation value $S_1$, the second signal quality evaluation value $S_2$ and the third signal quality evaluation value $S_3$ according to claim 2 are equal to or greater than 12.

6. An optical disk recording/reproduction apparatus or reproduction apparatus for performing data recording or data reproduction under a condition wherein the first signal quality evaluation value $S_1$, the second signal quality evaluation value $S_2$ and the third signal quality evaluation value $S_3$ according to claim 2 are equal to or greater than 15.

7. A signal quality evaluation method for a reproduced equalized signal obtained by reproducing and equalizing a signal recorded on an optical disk medium by using embossing, or by using an optical data recording apparatus, comprising the steps of:

projecting an equalization error onto a noise vector that is defined by using a partial response characteristic and a difference between two sets of time series data; and evaluating a signal quality based on a ratio of the variance of the projected equalization errors to an Euclid distance that is defined by using the partial response characteristic and the difference between the two sets of time series data.

8. An optical disk signal quality evaluation method for a reproduced equalized signal obtained by reproducing and equalizing a signal recorded on an optical disk medium by using embossing, or by using an optical data recording apparatus, comprising the steps of:

designating an equalization error $v_k=(y_k-\Sigma a_{k-i}h_i)$, wherein $y_k$ denotes the value of a signal reproduced and equalized for each clock cycle, $a_k$ denotes a predetermined data string and $h_k$ denotes a predetermined partial response characteristic, and designating a time delay operator D that uses a clock time as a unit;

designating as a polynomial $A(D)=\Sigma \alpha_j D_j$, which is defined by using $\alpha_j$, a coefficient of either 1, 0 or −1, and which satisfies $\alpha_j \alpha_{j+1} \neq -1$, and designating $H(D)=\Sigma h_k D_k$ as a PR polynomial that defines a partial response;

based on a polynomial defined as $N(D)=A(D)H(D)=\Sigma \epsilon_i D_i$, calculating a signal quality evaluation value S that is defined by the following equation (18)

$$S = \frac{N\left(\sum_i \epsilon_i^2\right)^2}{\sum_{k=1}^{N}\left(\sum_i \epsilon_i v_{k+i}\right)^2}; \quad (18)$$

and evaluating the quality of a signal recorded on an optical disk.

9. A signal quality evaluation method according to claim 8, wherein the quality of the signal recorded on the optical disk is evaluated based on the signal quality evaluation value S obtained for at least two sets in sets of tap coefficients $\epsilon_i$, one of which is a set of tap coefficients $\epsilon$ that provide the smallest Euclid distance $d=\Sigma \epsilon_i^2$ and another one of which is a set of tap coefficients $\epsilon$ that provide the second smallest Euclid distance d.

10. A signal quality evaluation method according to claim 8, wherein $h_0=1$, $h_1=2$, $h_2=2$, $h_3=2$ and $h_4=1$ are used as the partial response characteristic, and the quality of the signal recorded on the optical disk is evaluated based on the signal quality evaluation value S that is obtained for each set of tap coefficients $\epsilon$ that provide an Euclid distance d of 12 or 14.

11. A signal quality evaluation method according to claim 8, wherein $h_0=1$, $h_1=2$, $h_2=2$, $h_3=2$ and $h_4=1$ are used as the partial response characteristic, and the quality of the signal recorded on the optical disk is evaluated based on the signal quality evaluation value S that is obtained for each of at least three sets of tap coefficients $\epsilon$ that are represented by the following equation (19)

$\epsilon: \epsilon_0=1, \epsilon_1=2, \epsilon_2=2, \epsilon_3=2, \epsilon_4=1$ $\epsilon: \epsilon_0=1, \epsilon_1=2, \epsilon_2=1, \epsilon_3=0, \epsilon_4=-1, \epsilon_5=2, \epsilon_6=-1$ $\epsilon: \epsilon_0=1, \epsilon_1=2, \epsilon_2=1, \epsilon_3=0, \epsilon_4=0, \epsilon_5=0, \epsilon_6=1, \epsilon_2=2, \epsilon_8=1$ (19).

12. An optical disk, on which data are recorded under a condition wherein the signal quality evaluation value S according to claim 8 is equal to or greater than 12.

13. An optical disk, on which data are recorded under a condition wherein the signal quality evaluation value S according to claim 8 is equal to or greater than 15.

14. An optical disk recording/reproduction apparatus or reproduction apparatus for performing data recording or data reproduction under a condition wherein the signal quality evaluation value S according to claim 8 is equal to or greater than 12.

15. An optical disk recording/reproduction apparatus or reproduction apparatus for performing data recording or data reproduction under a condition wherein the signal quality evaluation value S according to claim 8 is equal to or greater than 15.

16. A signal quality evaluation method according to one of claims 1 to 8, wherein the predetermined data string is binary data for the reproduced equalized signal obtained by a Viterbi decoder.

17. A signal quality evaluation method according to claim 16, wherein the number N of samples is equal to or greater than $10^4$.

18. A signal quality evaluation method according to one of claims 8 to 2, whereby wherein the number N of samples is equal to or greater than $10^4$.

19. A signal quality evaluation apparatus, for a reproduced equalized signal $y_k$ that is obtained by reproducing and equalizing a signal that has been recorded in advance on an optical disk medium by using embossing or by using an optical data recording apparatus, comprising:
   a target signal generator for generating a target signal $\Sigma a_{k-i} h_i$ based on a predetermined data string $a_k$ and a predetermined partial response characteristic $h_k$;
   a computation unit for using the reproduced equalized signal $y_k$ and the target signal $\Sigma a_{k-i} h_i$ to calculate an equalization error $v_k = (y_k - \Sigma a_{k-i} h_i)$; and
   means for using auto-correlation for the equalization error to calculate a quality evaluation value for the reproduced equalized signal $y_k$.

20. A signal quality evaluation apparatus, for a reproduced equalized signal $y_k$ that is obtained by reproducing and equalizing a signal that has been recorded in advance on an optical disk medium by using embossing or by using an optical data recording apparatus, comprising:
   a target signal generator for generating a target signal $\Sigma a_{k-i} h_i$ based on a predetermined data string $a_k$ and a predetermined partial response characteristic $h_k$;
   a computation unit for using the reproduced equalized signal $y_k$ and the target signal $\Sigma a_{k-i} h_i$ to calculate an equalization error $v_k = (y_k - \Sigma a_{k-i} h_i)$;
   a delay element group, including a plurality of delay elements, for receiving the equalization error, and for outputting equalization errors $v_k, v_{k-1}, \ldots$ and $v_{k-1}+1$ a plurality of times;
   means for receiving the equalization errors $v_k, v_{k-1}, \ldots$ and $v_{k-n+1}$ and for calculating $R_n(n=0, 1, 2, \ldots$ to $L-1)$, based on the following equation (23), and outputting $R_n$;
   noise variance calculation means for performing weighting for $R_n$ with a coefficient $\beta_0, \beta_1, \ldots$ or $\beta_{L-1}$ to obtain a noise variance $\Sigma \beta_i R_i$ and
   quality evaluation value calculation means for using the noise variance $\Sigma \beta_i R_i$ to calculate a quality evaluation value for the reproduced equalized signal,
   wherein $$\text{Rn} = E\{V_k, v_{k-n}\}, \text{ and } E\{x_i, y_j\} \text{ is the average value of the product } x_i y_i \quad (23).$$

21. A signal quality evaluation apparatus, for a reproduced equalized signal $y_k$ that is obtained by reproducing and equalizing a signal that has been recorded in advance on an optical disk medium by using embossing or by using an optical data recording apparatus, comprising:
   a target signal generator for generating a target signal $\Sigma a_{k-i} h_i$ based on a predetermined data string $a_k$ and a predetermined partial response characteristic ($h_0=1$, $h_1=2$, $h_2=2$, $h_3=2$, $h_4=1$);
   a computation unit for using the reproduced equalized signal $y_k$ and the target signal $\Sigma a_{k-i} h_i$ to calculate an equalization error $v_k = (y_k - \Sigma a_{k-i} h_i)$;
   a delay element group, including a plurality of delay elements, for receiving the equalization error, and for outputting equalization errors $v_k, v_{k-1}, \ldots$ and $v_{k-n+1}$ a plurality of times;
   means for receiving the equalization errors $v_k, v_{k-1}, \ldots$ and $v_{k-n+1}$, and for calculating $R_n(n=0, 1, 2, \ldots$ to $L-1)$, based on the following equation (24), and outputting $R_n$;
   noise variance calculation means for performing weighting for $R_n$ with a coefficient $\beta_0, \beta_1, \ldots$ or $\beta_{L-1}$ to obtain a noise variance $\Sigma \beta_i R_i$, and
   quality evaluation value calculation means for using the noise variance $\Sigma \beta_i R_i$ to calculate a quality evaluation value for the reproduced equalized signal,
   wherein $$\text{Rn} = E\{v_k, v_{k-n}\}, \text{ and } \Sigma\{x_i, y_i\} \text{ is the average value of the product } x_i y_i \quad (24).$$

22. A signal quality evaluation apparatus according to claim 12, wherein the noise variance calculation means calculates a first noise variance $\sigma_1^2$ using the coefficients $\beta_0=1$, $\beta_1=12/7$, $\beta_2=8/7$, $\beta_3=4/7$ and $\beta_4=1/7$, calculates a second noise variance $\sigma_2^2$ using the coefficients $\beta_0=1$, $\beta_1=8/6$, $\beta_2=1/6$, $\beta_3=-4/6$, $\beta_{4=-1}$, $\beta_5=-4/6$ and $\beta_6=-1/6$, and calculates a third noise variance $\sigma_3^2$ using the coefficients $\beta_0=1$, $\beta_1=8/6$, $\beta_2=2/6$, $\beta_3=0$, $\beta_4=1/6$, $\beta_5=4/6$, $\beta_6=1$, $\beta_7=4/6$ and $\beta_8=1/6$; and wherein the quality evaluation value calculation means calculates the quality evaluation value by using the smallest of the values $(14/\sigma_1^2)$, $(12/\sigma_2^2)$ and $(12/\sigma_3^2)$.

23. An optical disk apparatus on which a quality evaluation apparatus according to one of claims 19 to 22 is mounted.

24. A signal quality evaluation apparatus according to one of claims 10 to 22, wherein the predetermined data string is obtained by performing Viterbi decoding for the reproduced equalized signal.

25. An optical disk recording/reproduction or reproduction apparatus comprising:
   means for generating a target signal based on the value of a signal reproduced for each clock cycle, a predetermined data string and a predetermined partial response characteristic; and
   means for calculating an equalization error that is the difference between the signal reproduced for each clock cycle and the target signal.

26. An optical disk recording/reproduction or reproduction apparatus according to claim 25, further comprising:
   means for performing addition or multiplication, or a sum of product operation, for equalization errors occurring at different times.

27. An optical disk recording/reproduction or reproduction apparatus according to claim 25 or 26, wherein at least $10^4$ equalization errors are obtained through calculation.

* * * * *